United States Patent
Mellon, Jr.

(10) Patent No.: US 9,509,144 B1
(45) Date of Patent: Nov. 29, 2016

(54) UNIVERSAL POWERING STATION AND A METHOD FOR IMPLEMENTING SAME

(71) Applicant: Lex Products Corporation, Shelton, CT (US)

(72) Inventor: Tyrone Joseph Mellon, Jr., Bridgeport, CT (US)

(73) Assignee: LEX PRODUCTS, Shelton, CT (US)

( * ) Notice: Subject to any disclaimer, the term of this patent is extended or adjusted under 35 U.S.C. 154(b) by 666 days.

(21) Appl. No.: 13/680,555

(22) Filed: Nov. 19, 2012

Related U.S. Application Data

(60) Provisional application No. 61/629,402, filed on Nov. 19, 2011.

(51) Int. Cl.
*H01H 47/00* (2006.01)
*H01H 83/00* (2006.01)
*H02J 7/00* (2006.01)
*H02J 4/00* (2006.01)

(52) U.S. Cl.
CPC ........................................ *H02J 4/00* (2013.01)

(58) Field of Classification Search
CPC ........................................................ H02J 4/00

USPC ............................................................ 307/125
See application file for complete search history.

(56) References Cited

U.S. PATENT DOCUMENTS

| | | | |
|---|---|---|---|
| 2009/0236909 A1* | 9/2009 | Aldag et al. | 307/39 |
| 2011/0121780 A1* | 5/2011 | Fukuo et al. | 320/109 |
| 2011/0216453 A1* | 9/2011 | Haines et al. | 361/49 |
| 2012/0313562 A1* | 12/2012 | Murao et al. | 318/139 |

* cited by examiner

*Primary Examiner* — Rexford Barnie
*Assistant Examiner* — Toan Vu
(74) *Attorney, Agent, or Firm* — Steven M. McHugh

(57) ABSTRACT

A configurable power distribution system is provided and includes a power input from a power source, a power output device having a first power connection and a second power connection, a voltage monitoring device and a plurality of relay devices connected with the voltage monitoring device and the power output device. It should be appreciated that the plurality of relay devices are configurably responsive to the voltage monitoring device, and the power output device is connected to the plurality of relays such that the power at the first power connection and second power connection is responsive to the configuration of plurality of relay devices.

16 Claims, 15 Drawing Sheets

*Table 1-1*

VOLTAGE MONITOR BEHAVIOR

| Wiring Scheme For Contactors | | |
|---|---|---|
| Contactor | 1L1 | 3L2 |
| M1 | Phase A | Phase B |
| M2 | Phase A | Neutral |
| M3 | Phase B | Phase C |
| M4 | Phase B | Neutral |
| M5 | Phase C | Phase A |
| M6 | Phase C | Neutral |

*Table 1-2*

*FIG. 5*

Section C

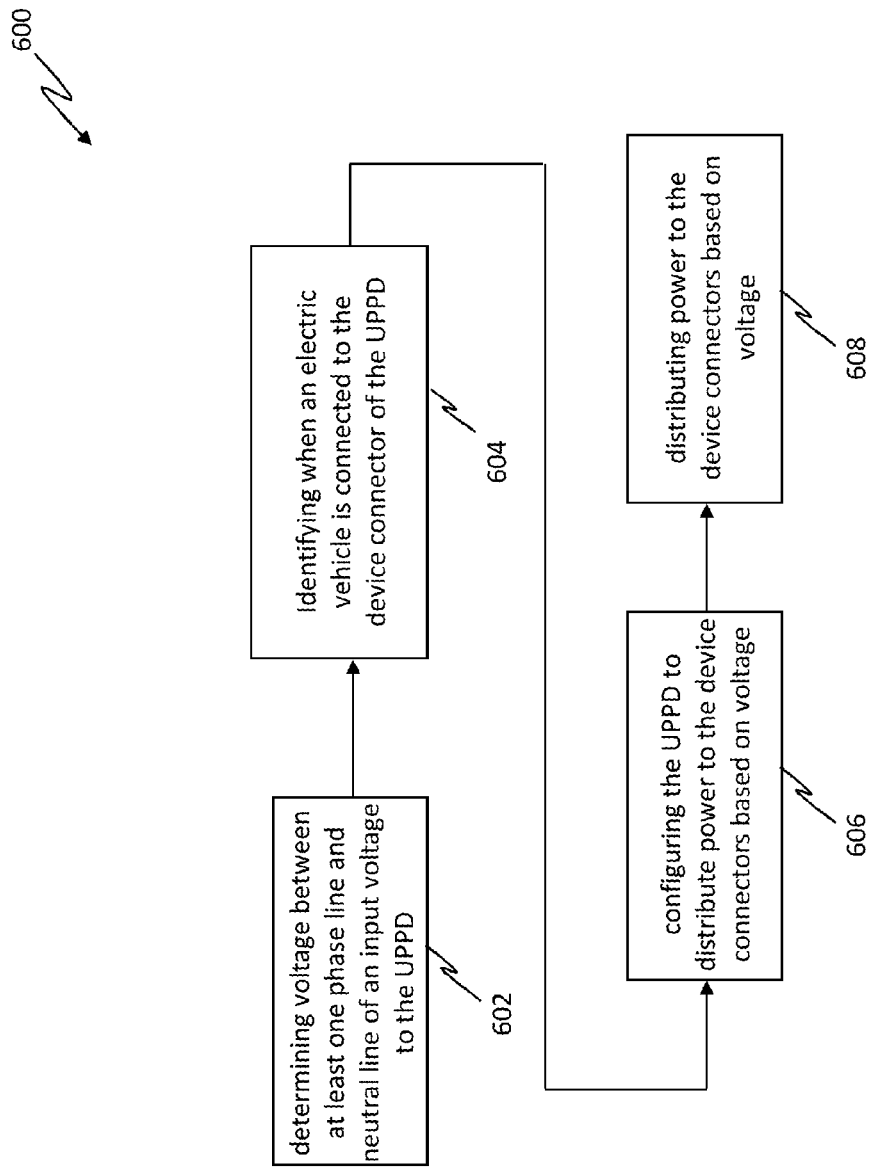

UNIVERSAL POWERING STATION AND A METHOD FOR IMPLEMENTING SAME

RELATED APPLICATIONS

This application claims priority to and benefit of the filing date of U.S. Provisional Patent Application Ser. No. 61/629,402, filed Nov. 19, 2011, the contents of which are incorporated by reference herein in its entirety.

FIELD OF THE INVENTION

The present invention relates generally to a Universal Portable Power Device (UPPD) and more particularly to a Universal Portable Power Device (UPPD) that can function as portable Electric Vehicle Service Equipment (EVSE) used for charging electrical (or hybrid electric) vehicles as well as other applications.

BACKGROUND OF THE INVENTION

Equipment that provides charging power for electric (or hybrid electric) vehicles is typically referred to as Electric Vehicle Service Equipment (EVSE) or charging stations. In North America, SAE J1772 is the standard for providing charging power to electric (or hybrid electric) vehicles as well as other devices. This standard allows for different charging voltage levels with the highest supported voltage level range being Level 2 voltages, where Level 1 voltage is typically 120V and Level 2 voltages are voltages between 208V to 240V.

Currently, there are two main powering conventions used throughout the world. One convention, which is prevalent in North America, Japan and some parts of South America, uses 208/120V, while the other convention, which is prevalent in Europe, Asia, and other parts of South America, uses 400/230V. Additionally, there are still some areas, such as Brazil, where there is no standard voltage and thus more than one nominal voltage may be encountered.

One of the problems with having multiple power conventions, as well as areas with multiple voltages, is that equipment that is not configured to operate off of the local power grid typically cannot be powered or charged from that grid without risking damage or performance degradation. Additionally, due to differing equipment standards electric (or hybrid-electric) vehicles configured for use in the United States (and similar regions) typically cannot use the same charging equipment as electric (or hybrid-electric) vehicles that are configured for use in Europe (and similar regions). As one example, in the United States the SAE J1772 connector (See FIG. 1A and FIG. 1B) is used for connecting and charging electric (or hybrid-electric) vehicles, whereas in parts of Europe the VDE-AR-E 2623-2-2 based connectors (See FIG. 1C) are used. This can be problematic in situations where electric (or hybrid-electric) vehicles (or other devices) need charging (or power), but are not configured for local power conventions.

SUMMARY OF THE INVENTION

A configurable power distribution system is provided and includes a power input from a power source, a power output device having a first power connection and a second power connection, a voltage monitoring device and a plurality of relay devices connected with the voltage monitoring device and the power output device. It should be appreciated that the plurality of relay devices are configurably responsive to the voltage monitoring device, and the power output device is connected to the plurality of relays such that the power at the first power connection and second power connection is responsive to the configuration of plurality of relay devices.

A configurable power distribution system is provided and includes a power input from a power source, wherein the power input includes a first phase power input, a second phase power input, a third phase power input, a neutral input and a ground input. A power output device is also provided and includes a first power connection and a second power connection, a ground connection and a control signal connection, wherein the power output device is configured to connect to a vehicle that accepts an electrical charge. Also, a voltage monitoring device configured to monitor a nominal voltage between the neutral input and at least one of the first phase power input, the second phase power input and the third phase power input and a plurality of relay devices connected with the voltage monitoring device and the power output device, is provided, wherein the plurality of relay devices are associated with the monitoring device such that the power at the first power connection and the second power connection are responsive to the nominal voltage.

A method for distributing power via a configurable power distribution system, wherein the configurable power distribution system includes a power output device having a first power connection and a second power connection, a voltage monitoring device and a plurality of relay devices connected with the voltage monitoring device and the power output device, wherein the plurality of relay devices are configurably responsive to the voltage monitoring device, and wherein the power output device is connected to the plurality of relays such that the power at the first power connection and second power connection is responsive to a characteristic of input power to the configurable power distribution system is provided wherein the method includes receiving the input power from a power source, wherein the input power connection includes a plurality of power phase connections, a neutral connection and a ground connection, monitoring the voltage differential between at least one of the plurality of power phase connections and the neutral connection to identify a nominal voltage and electrically connecting at least one of the plurality of power phase connections and neutral connection with the first power connection and the second power connection of the power output device.

BRIEF DESCRIPTION OF THE DRAWINGS

The foregoing and other features and advantages of the present invention will be better understood from the following detailed description of illustrative embodiments, taken in conjunction with the accompanying drawings in which:

FIG. 5 shows a table illustrating one embodiment of phase power—relay connections of a UPPD having multiple output connectors for balancing considerations, in according with another embodiment of the present invention.

FIG. 7 is an operational block diagram illustrating a method for distributing power from a power source to a device, in accordance with one embodiment.

DETAILED DESCRIPTION OF THE INVENTION

In accordance with the present invention, a Universal Portable Power Device (UPPD) configured for use as Electric Vehicle Service Equipment (EVSE) or charging station for charging electrical (or hybrid electric) vehicles is provided and described herein. It should also be appreciated that the UPPD may be used to power/charge other electrical devices as well. Additionally, a method for implementing the UPPD as a EVSE is provided and described where when the UPPD is connected to a three-phase power source (such as a local power grid or a generator device), the UPPD senses the nominal (Line to Neutral) voltage of the power source (or some other characteristic of the power source suitable to the desired end purpose of identifying the voltage levels) and configures the output power of the UPPD in response so that the electrical (or hybrid electric) vehicle as well as other electrical devices can be charged and/or powered.

Figure 1A:
FIG. 1A is a front side isometric view of an SAE J1772 connector used for charging electric vehicles, in accordance with the prior art.
Figure 1B:
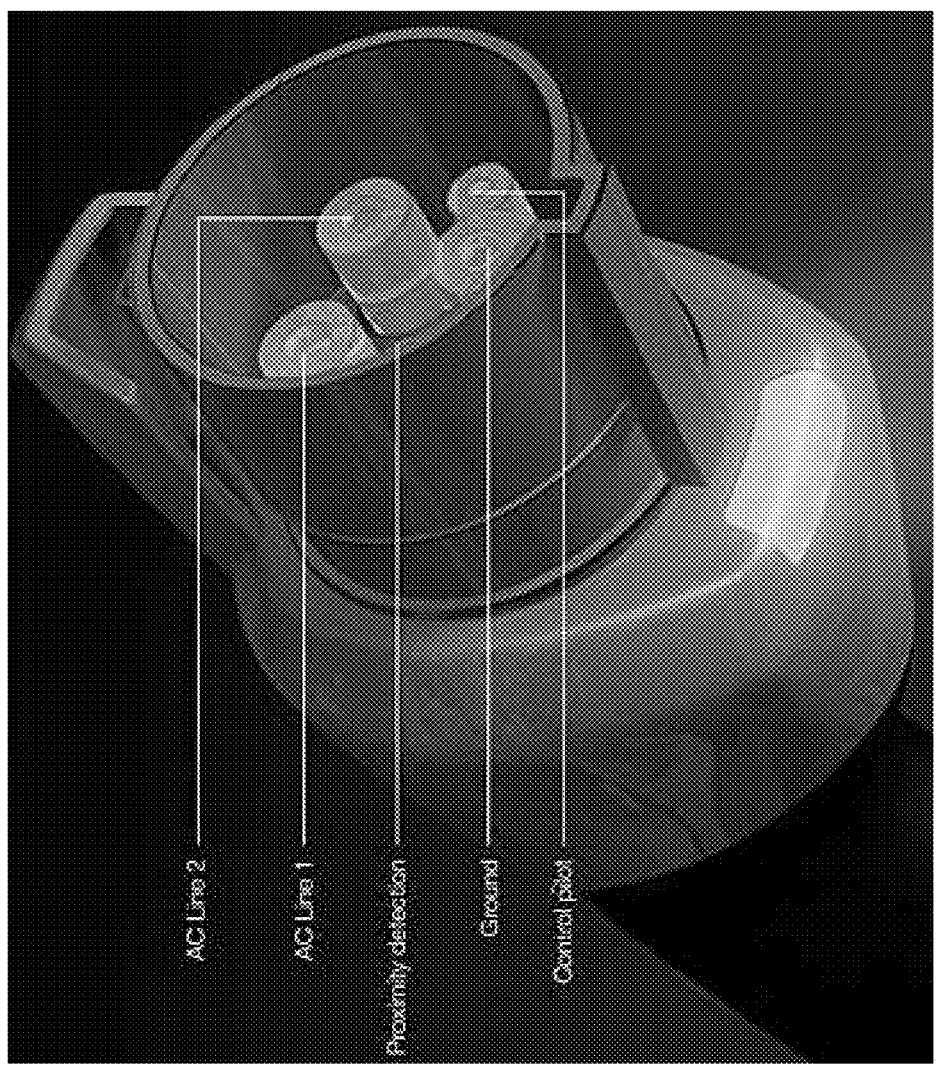
FIG. 1B is a front side isometric view of the SAE J1772 connector of FIG. 1A.
Figure 1C:
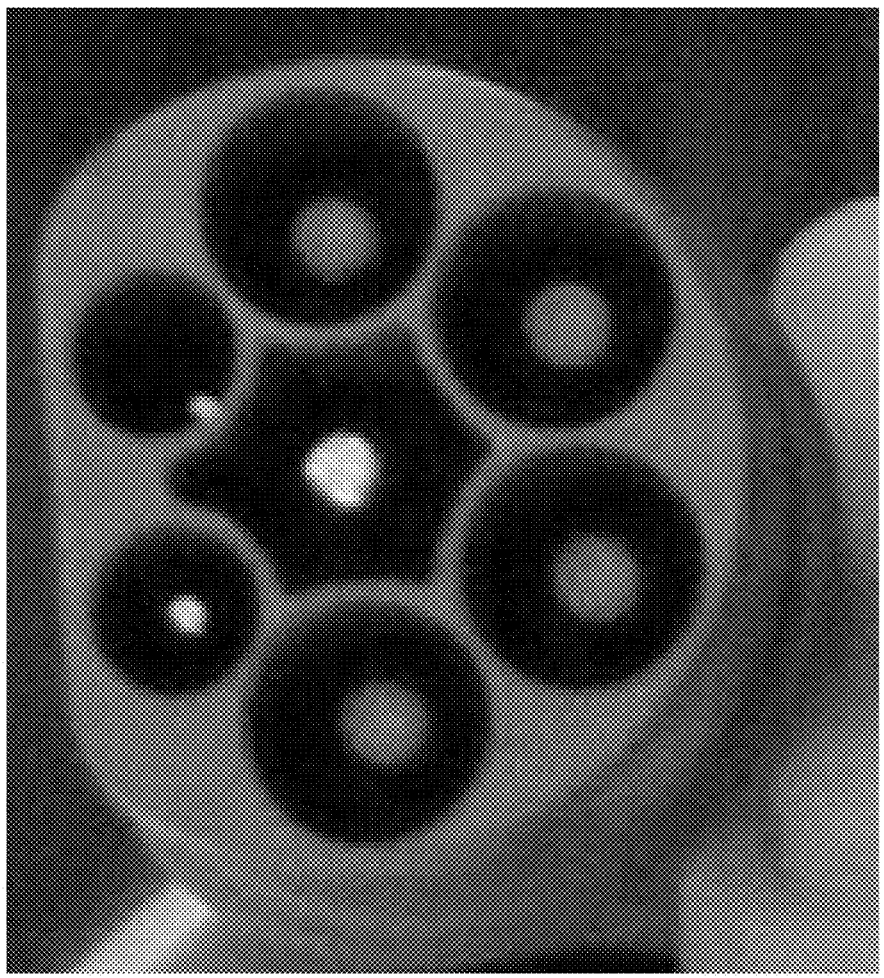
FIG. 1C is a front isometric view of a VDE-AR-E 2623-2-2 based connector used for charging electric vehicles, in accordance with the prior art.
Figure 2A:
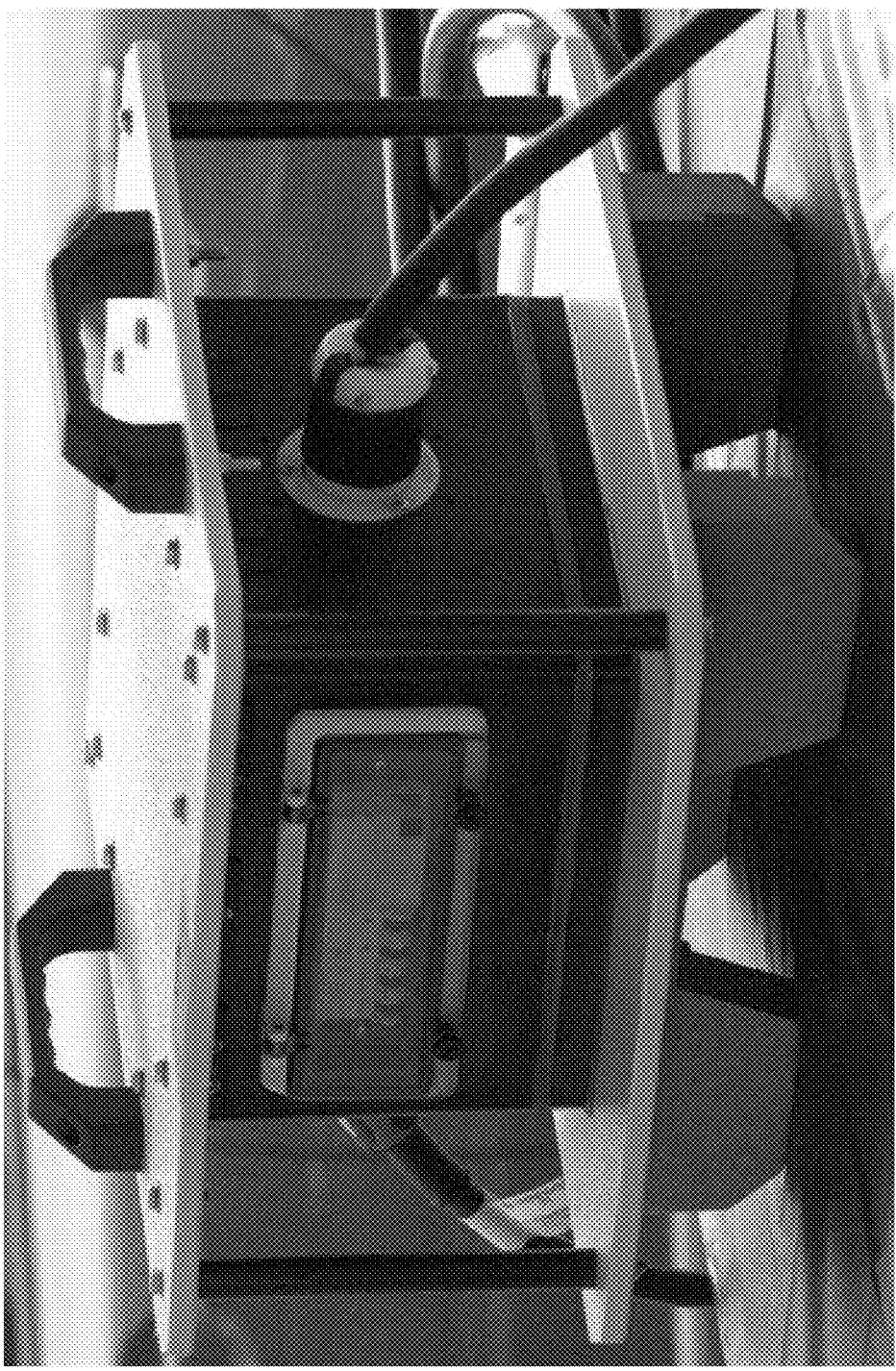
FIG. 2A is a side rear view of a UPPD configured for use as an Electric Vehicle Charging Station with one charging connector, in accordance with one embodiment of the present invention.
Figure 2B:
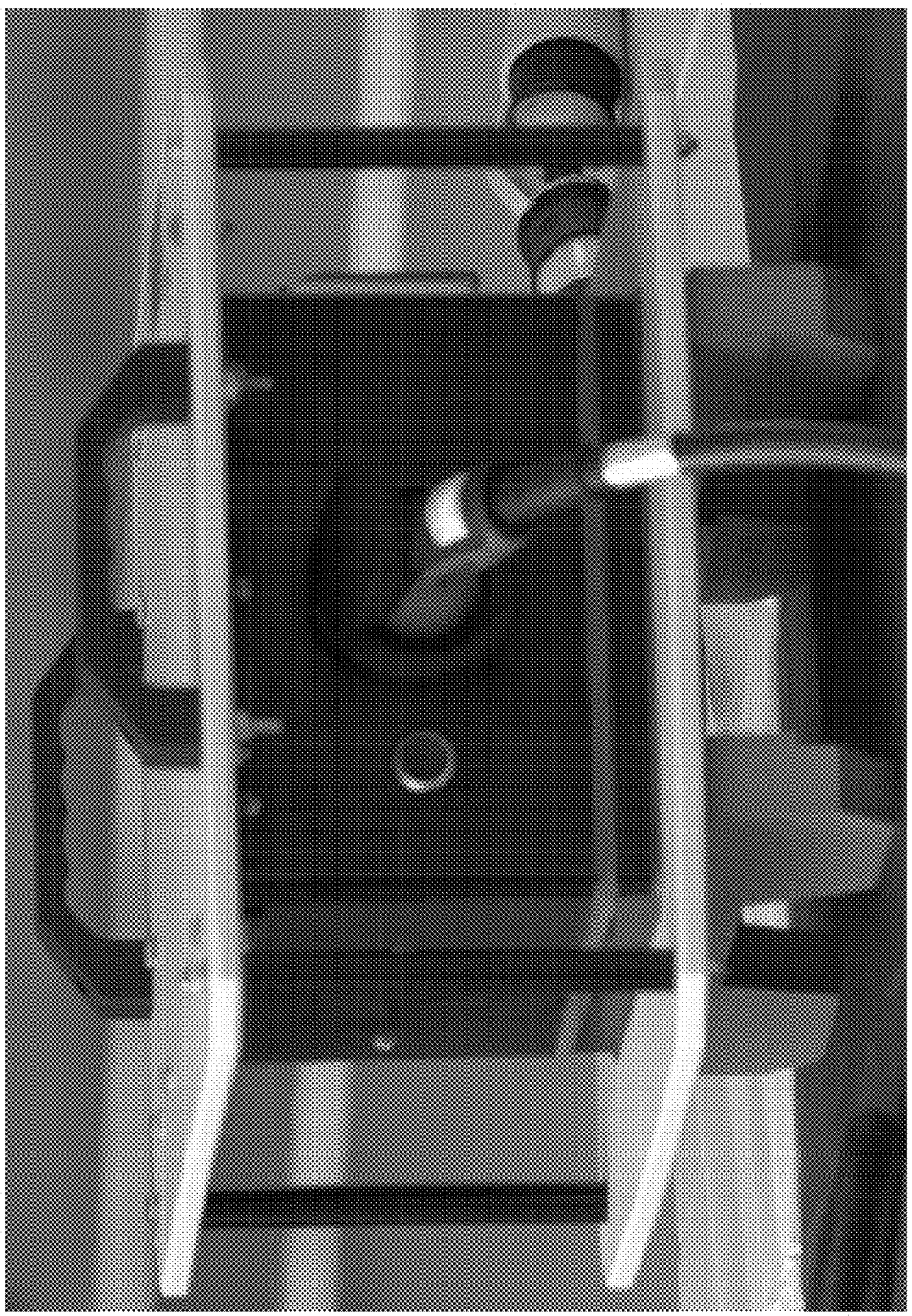
FIG. 2B is a front view of the UPPD of FIG. 2A.
Figure 2C:
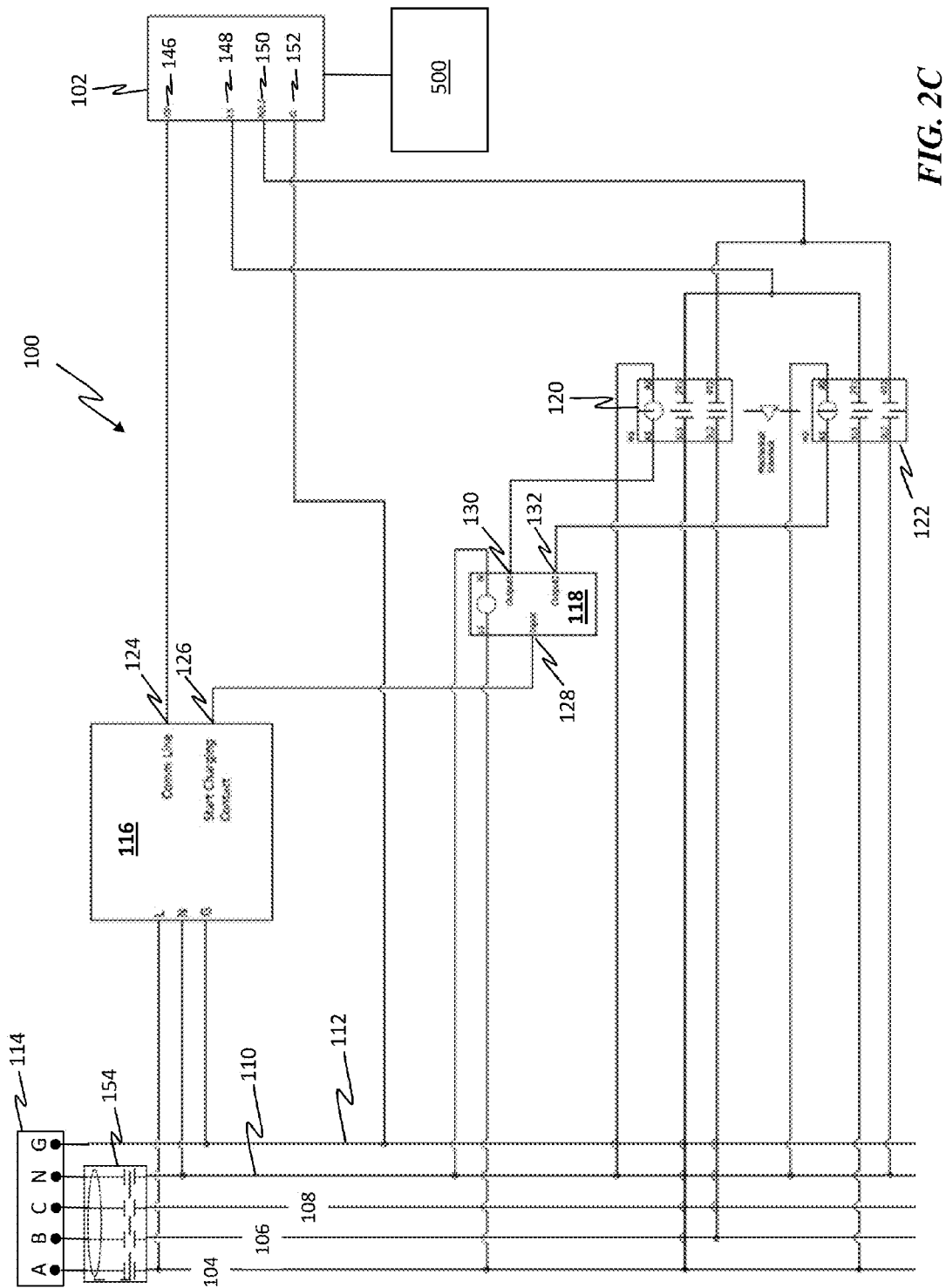
FIG. 2C is a schematic block diagram illustrating one embodiment of the electrical arrangement of the UPPD of FIG. 2A.

Referring to FIG. 2A, FIG. 2B and FIG. 2C, one embodiment of the UPPD 100 is illustrated and is configured for use with one device connector 102, wherein the device connector 102 is configured to electrically connect with an electrical (or hybrid electric) vehicle for charging. The UPPD 100 includes a UPPD first electrical input PS-L1 104, a UPPD second electrical input PS-L2 106, a UPPD third electrical input PS-L3 108, a UPPD neutral input PS-N 110 and a UPPD ground input PS-G 112. The UPPD 100 is connected to a power source 114 such that the UPPD first electrical input PS-L1 104 is connected to Phase A of the power source 114, the UPPD second electrical input PS-L2 106 is connected to Phase B of the power source 114, the UPPD third electrical input PS-L3 108 is connected to Phase C of the power source 114, the UPPD neutral input PS-N 110 is connected to the neutral of the power source 114 and the UPPD ground input PS-G 112 is connected to the ground of the power source 114.

It should be appreciated that the UPPD 100 may be hardwired to the power source 114 or the UPPD 100 include an input connector that will plug into the power source 114.

Figure 2D:
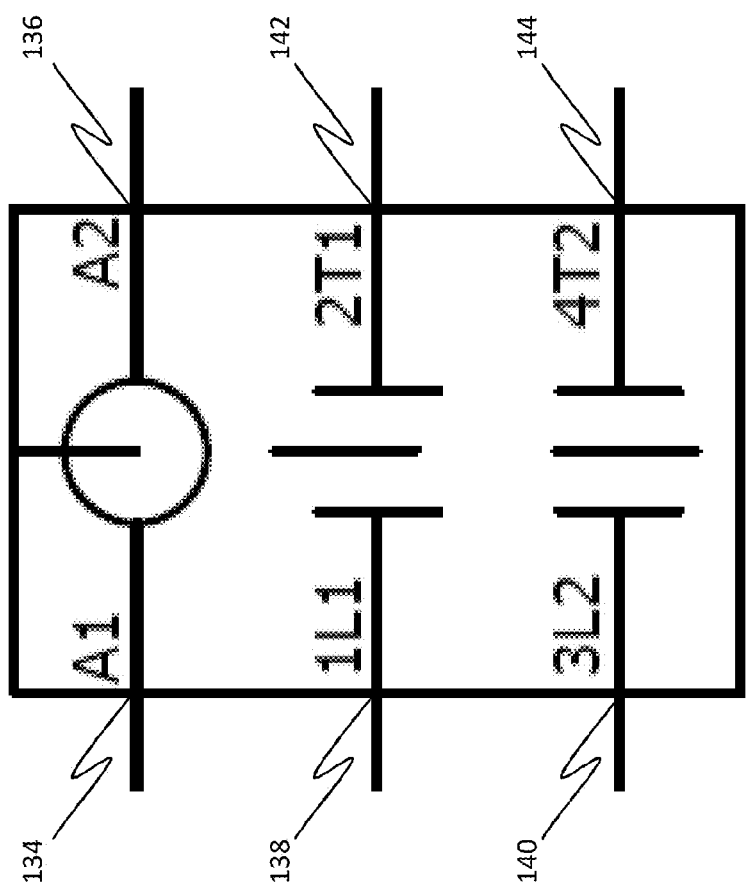
FIG. 2D is a schematic block diagram illustrating input/output ports of the relays used in the electrical arrangement of the UPPD of FIG. 2A.

The UPPD 100 further includes a communications module 116, a voltage monitor 118, a first relay device 120 and a second relay device 122. The communications module 116 includes a communications port (CI) 124 and a voltage monitor interface port 126. The voltage monitor 118 includes a VM control port 128, a first output port 130 and a second output port 132. Referring to FIG. 2D, each of the first relay device 120 and second relay device 122 include relay power input port 134, a relay neutral input port 136, a first input signal port 138, a second input signal port 140, a first output signal port 142 and a second output signal port 144. The device connector 102 includes a control port CP 146, a device first output port L1 148, a device second output port N/L2 150 and a device ground port G 152.

As shown in FIG. 2C, the communications module 116 is connected to the UPPD neutral input 110, the UPPD ground input 112 and at least one of the UPPD first electrical input 104, UPPD second electrical input 106 and the UPPD third electrical input 108. The communications port CI 124 is connected to the control port CP 146 of the device connector 102 and the voltage monitoring interface port 126 is connected to the VM control port 128 of the voltage monitor 118. The first output port 130 of the voltage monitor 118 is connected to the relay power input port 134 of the first relay device 120 and the second output port 132 of the voltage monitor 118 is connected to the relay power input port 134 of the second relay device 122. Additionally, the voltage monitor 118 is connected to the UPPD neutral input 110 and at least one of the UPPD first electrical input 104, UPPD second electrical input 106 and the UPPD third electrical input 108.

The relay neutral input port 136 of the first relay device 120 is connected to the UPPD neutral input PS-N 110, the first input signal port 138 of the first relay device 120 is connected to one of the input power phases (i.e. at least one of the UPPD first electrical input 104, UPPD second electrical input 106 and the UPPD third electrical input 108). The second input signal port 140 of the first relay device 120 is connected to one of the remaining two input power phases. For example, as shown in FIG. 2C, the first input signal port 138 of the first relay device 120 is connected to Phase A of the input power (via UPPD first electrical input 104) and the second input signal port 140 of the first relay device 120 is connected to Phase B of the input power via UPPD second electrical input 106. It should be appreciated that other configurations as desired may be used such as the second input signal port 140 of the first relay device 120 being connected to Phase C of the input power via UPPD third electrical input 108. Moreover, the first output signal port 142 of the first relay device 120 is connected to the device first output port L1 148 of the device connector 102 and the second output signal port 144 of the first relay device 120 is connected to the device second output port N/L2 150 of the device connector 102.

Furthermore, the first input signal port 138 of the second relay device 122 is connected to one of the input power phases (i.e. at least one of the UPPD first electrical input 104, UPPD second electrical input 106 and the UPPD third electrical input 108) and the second input signal port 140 of the second relay device 122 is connected to the UPPD neutral input PS-N 110. Moreover, the first output signal port 142 of the second relay device 122 is connected to the device first output port L1 148 of the device connector 102 and the second output signal port 144 of the second relay device 122 is connected to the device second output port N/L2 150 of the device connector 102.

It should be appreciated that at least one Charge Circuit Interruption Device (CCID) 154 or similar article is included and is located to be in line between the power phases and the first and second input signal ports 138, 140 of the first and second relay devices 120, 122. It should be appreciated that the CCID 154 is configured to provide an acceptable threshold for EVSE equipment as desired or as provided by acceptable industry norms and standards. For example, the CCID 154 in this embodiment is configured to provide a charging current threshold of 20 mA, but this threshold may be configured for other thresholds and may be programmable. Moreover, if desired a interlock device may be associated with the first and second relay devices 120, 122 to ensure that only one of the first and second relay devices 120, 122 may be closed at a time.

In accordance with the present invention, the UPPD 100 monitors the UPPD first electrical input PS-L1 104, UPPD second electrical input PS-L2 106 and UPPD third electrical input PS-L3 108 to determine the nominal voltage of the input power from the power source 114. If the nominal voltage of the input power source 114 is less than or equal to 100 Volts or greater than 255 Volts (100V≥Nominal Voltage>255V) then the outputs of the UPPD 100 are turned off. If the nominal voltage of the input power from the power source 114 is greater than 100V and less than or equal to 135V (100V<Nominal Voltage≤135V), then the output of the UPPD 100 is configured into a first configuration 125 as described further hereinafter. If the nominal voltage of the input power from the power source 114 is greater than 135V and less than or equal to 255V (135V<Nominal Voltage≤255V), then the output of the UPPD 100 is configured into a second configuration 127 as described further hereinafter. These configurations are summarized in Table 1-1 shown in FIG. 3 where the voltages in Table 1-1 reference the Line to Neutral voltage on a three phase system.

In accordance with the present invention, when the nominal voltage of the input power from the power source 114 is greater than 100V and less than or equal to 135V (i.e. 100V<Nominal Voltage≤135V), the UPPD 100 is configured in the first configuration 125. In this case, the first output port 130 of the voltage monitor 118 will pass through the power signal being introduced into VM control port 128 to the first relay device 120, causing the first relay device 120 to be 'turned on.' The output of the second output port 132 of the voltage monitor 118 will be 'turned off' so that the second relay device 122 will be 'turned off'. Accordingly, the power signal at the first output signal port 142 of the first relay device 120 (i.e. power Phase A) will be output at the device first output port L1 148 of the device connector 102 and the signal at the second output signal port 144 of the first relay device 120 (power Phase B) will be output at the device second output port N/L2 150.

When the nominal voltage of the input power from the power source 114 is greater than 135V and less than or equal to 255V (i.e. 135V<Nominal Voltage≤255V), the UPPD 100 is configured in the second configuration 127. In this case, the second output port 132 of the voltage monitor 118 will pass through the power signal being introduced into VM control port 128 to the second relay device 122, causing the second relay device 122 to be 'turned on.' The output of the first output port 130 of the voltage monitor 118 will be 'turned off' so that the first relay device 120 will be 'turned off'. Accordingly, the power signal at the first output signal port 142 of the second relay device 122 (i.e. power Phase A) will be output at the device first output port L1 148 of the device connector 102 and the signal at the second output signal port 144 of the second relay device 122 (Neutral) will be output at the device second output port N/L2 150.

When the nominal voltage of the input power from the power source 114 is less than or equal to 100V and greater than 255V (i.e. 100V≥Nominal Voltage>255V), the UPPD 100 is turned off (i.e. the first and second output port 130, 132 of the voltage monitor 118 and the first and second relay devices 120, 122 are turned off) so that no power is present at the first output port L1 148 and second output port N/L2 150 of the device connector 102.

It should be appreciated that the present invention advantageously allows the UPPD 100 to be used for powering and charging devices that operate at Level 1 (i.e. the first configuration) and Level 2 (i.e. the second configuration) voltages. Thus, the UPPD 100 may be operate as a power source for a variety of devices, such as charging electric (or hybrid vehicles) or for powering other types of electrical equipment (for example, equipment that is used in touring entertainment applications, such as amplifiers, audio/visual equipment, musical instruments, stage lighting, etc).

When an electric (or hybrid-electric) vehicle 500 is connected to the UPPD 100 via the device (charging) connector 102, communication between the vehicle 500 and the UPPD 100 is established via the connection between the communications port CI 124 and the control port CP 146 of the device connector 102. When the vehicle 500 is ready to begin charging, the UPPD 100 recognizes that the vehicle 500 is configured and ready to be charged. The nominal voltage (between Line and Neutral) of the power source 114 is monitored by the voltage monitor 118 and the UPPD 100 is configured to either be turned off or to output voltage in accordance with either the first configuration 125 or the second configuration 127 (See FIG. 3). As discussed above, when in the first configuration 125 the first relay device 120 is activated (the second relay device 122 is deactivate) such that one phase of the power source 114 (as desired) is connected to the device first output port L1 148, a second phase of the power source 114 (one of remaining phases—not connected to L1) is connected to the second output port N/L2 150 and the power source ground is connected to the device ground port G 152. When in the second configuration 127, one phase of the power source(as desired) is connected to the device first output port L1 148, the power source neutral is connected to the second output port N/L2 150 and the power source ground is connected to the device ground port G 152.

It should be appreciated that in one embodiment, the nominal voltage is determined when the UPPD 100 is connected to the power source. In another embodiment, the nominal voltage may be determined when a vehicle 500 is connected to the UPPD 100. In this case, no power is sent to the device connector 102 until after the vehicle 500 is connected and the initial communications 'handshake' has taken place. It should be appreciated that it is considered within the scope of the invention that other ways of determining nominal voltage is contemplated.

Figure 3:
FIG. 3 shows a table illustrating different output configurations at the charging connector of the UPPD of FIG. 2A in response to the determined nominal Line to Neutral Voltage, in according with one embodiment of the present invention.
Figure 4:
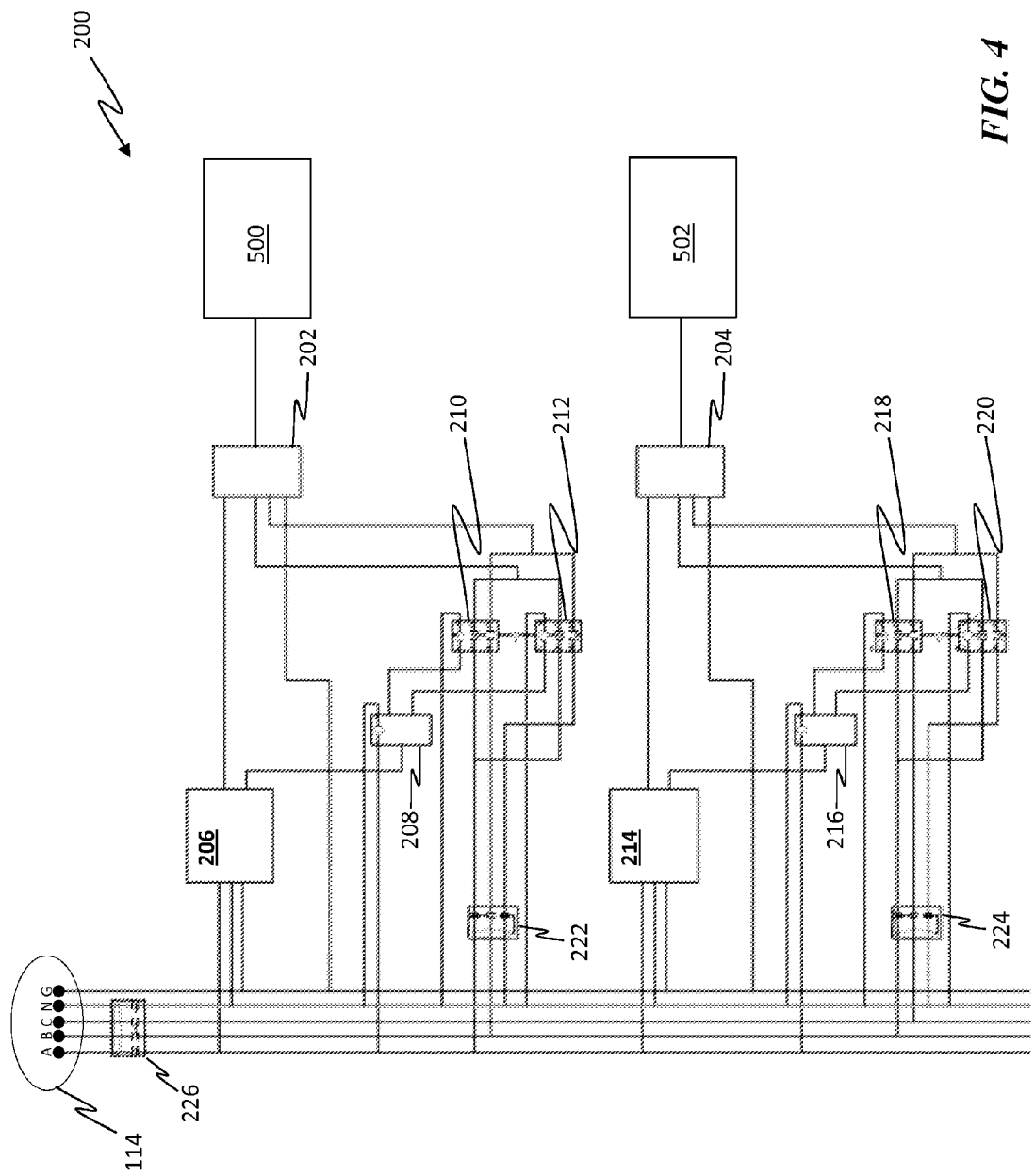
FIG. 4 is a schematic block diagram illustrating another embodiment of the electrical arrangement of the UPPD with two output connectors.
Figure 6A:
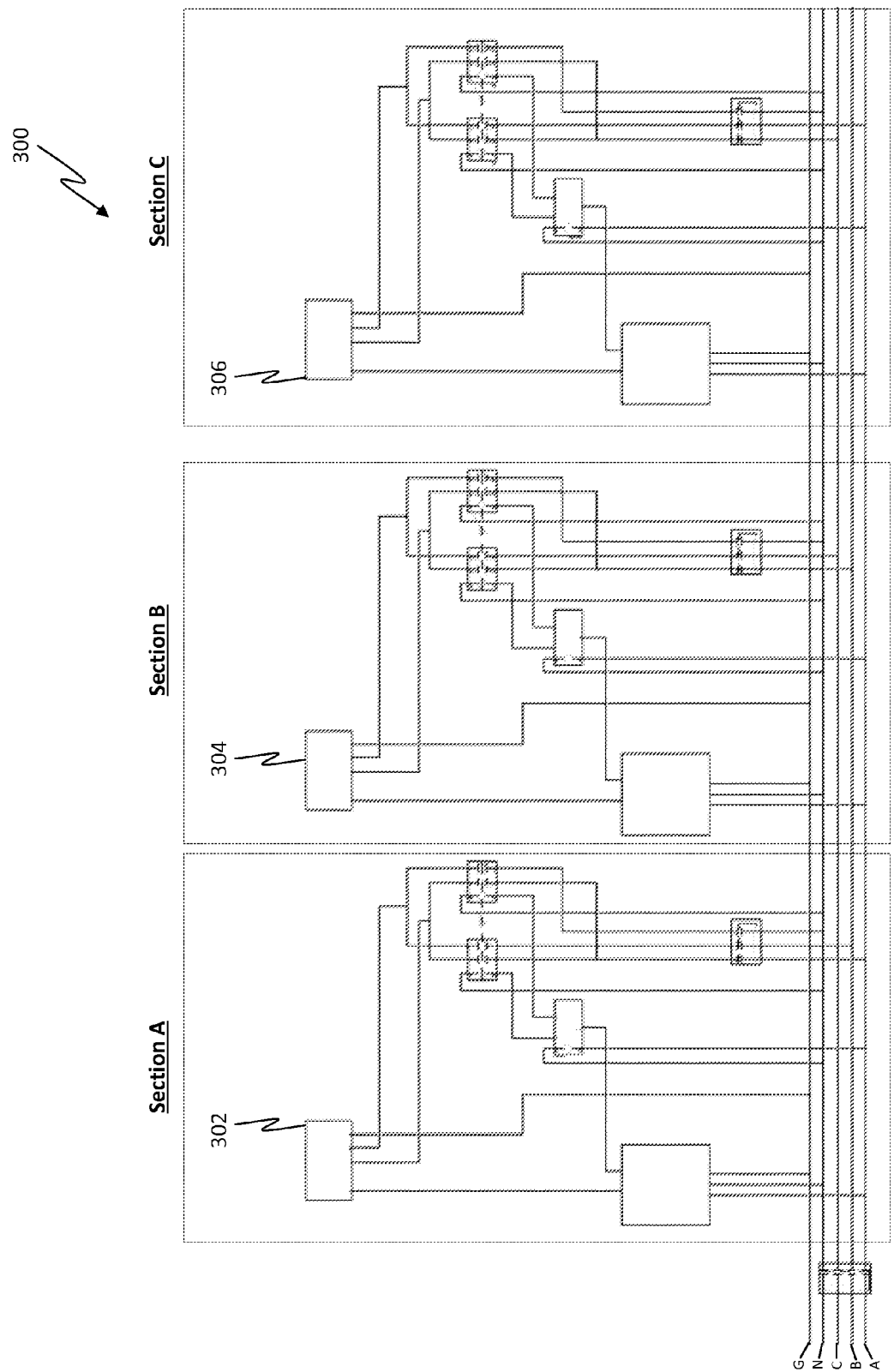
FIG. 6A is a schematic block diagram showing still yet another embodiment of the UPPD being configured for use as an Electric Vehicle Charging Station with a multiple of charging connectors.
Figure 6B:
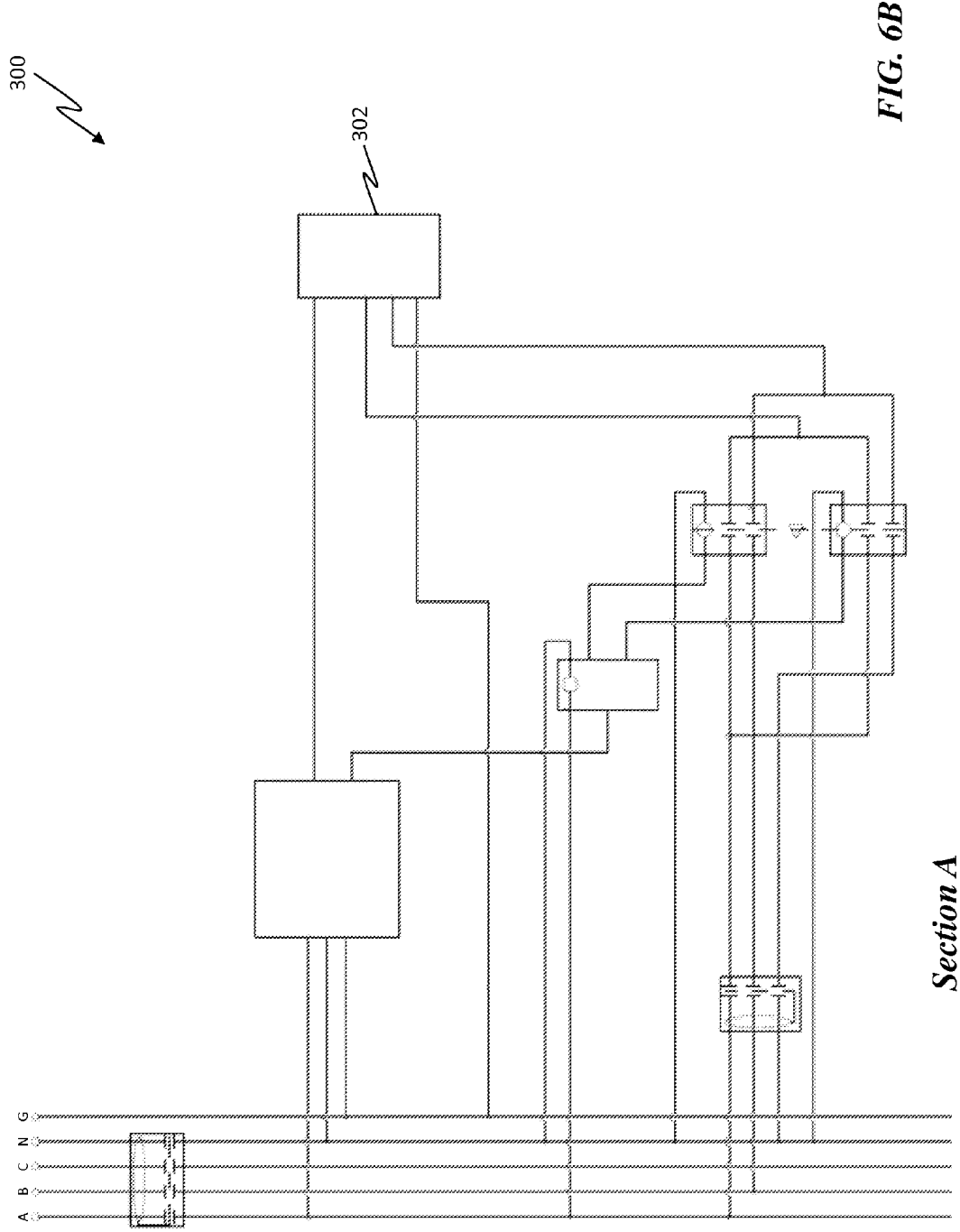
FIG. 6B is a close up view of Section A of the schematic block diagram of FIG. 6A.
Figure 6C:
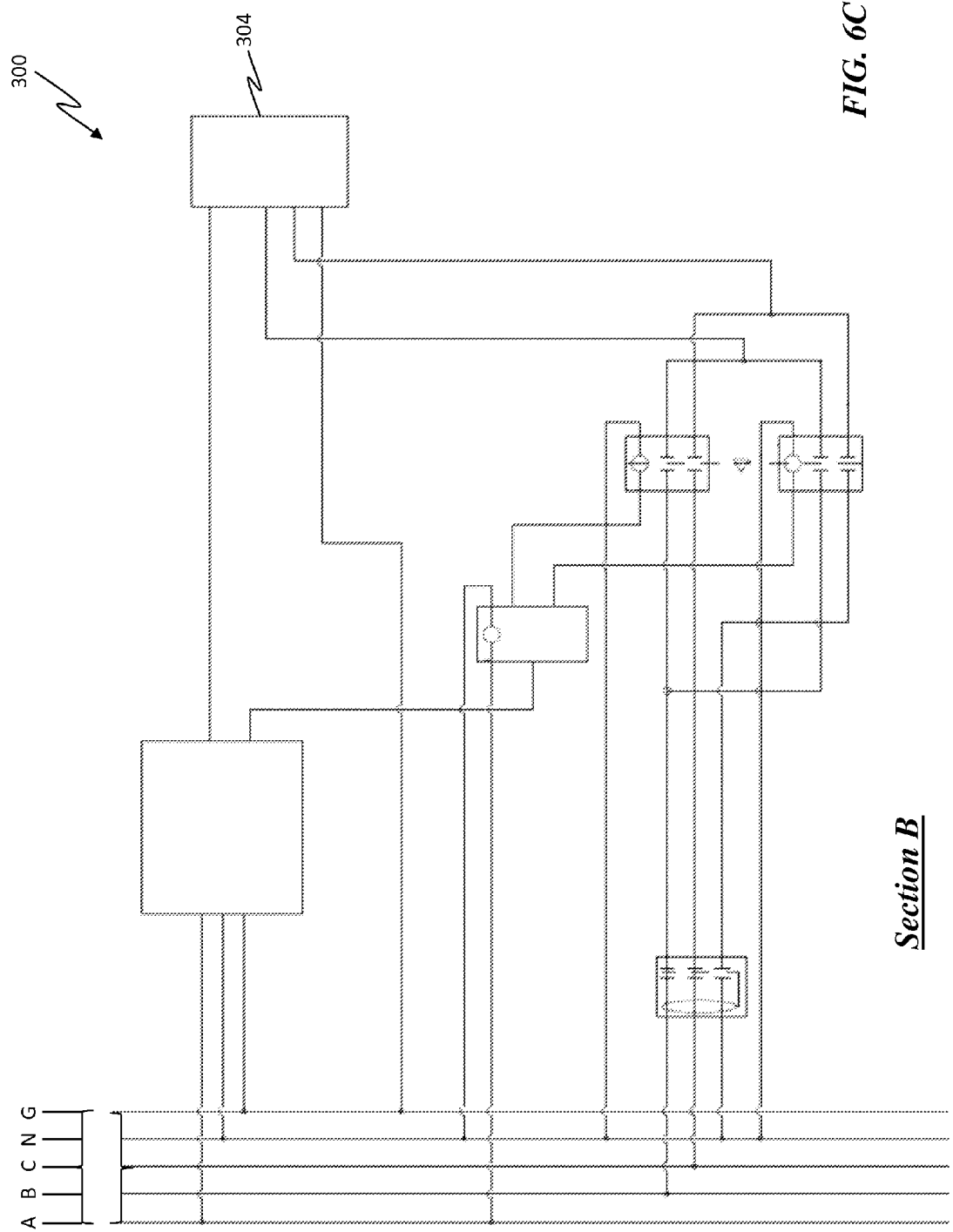
FIG. 6C is a close up view of Section B of the schematic block diagram of FIG. 6A.
Figure 6D:
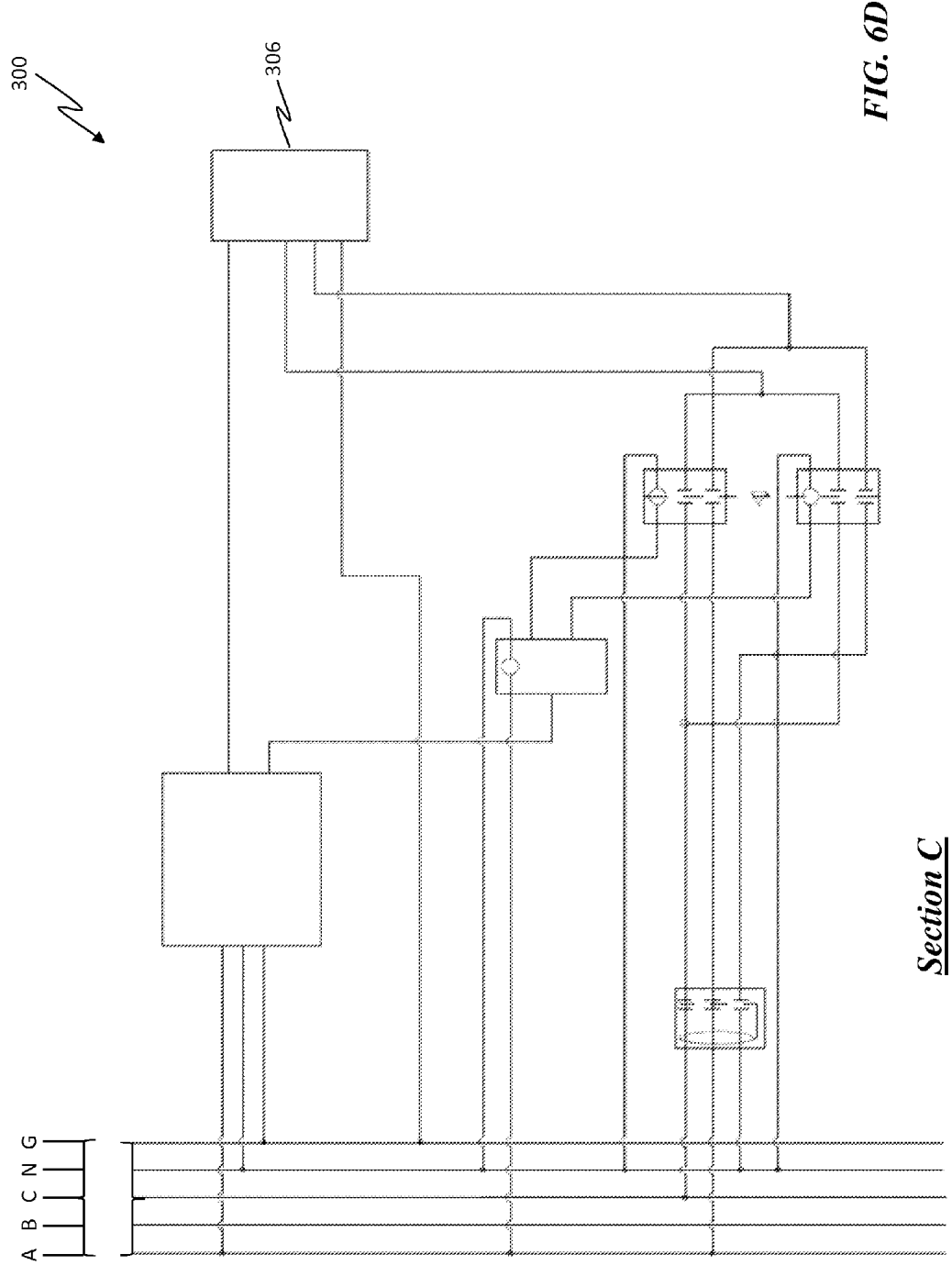
FIG. 6D is a close up view of Section C of the schematic block diagram of FIG. 6A.

It should also be appreciated that the present invention can be configured to operate with multiple device connectors (charging outlets) as desired. Referring to FIG. 4, another embodiment of the UPPD 200 is shown and is configured to include a first charging connector 202 and a second charging connector 204. In this embodiment, the first device (charging) connector 202 is associated with a first communications module 206, a first voltage monitor 208, a first relay device 210 and a second relay device 212 and the second device (charging) connector 204 is associated with a second communications module 214, a second voltage monitor 216, a third relay device 218 and a fourth relay device 220 and are connected as shown in FIG. 3 and as discussed hereinabove. Also, as discussed hereinabove, a first Charge Circuit Interruption Device (CCID) 222 or similar article is included and is located to be in line between the power phases and the first and second relay devices 210, 212 and a second Charge Circuit Interruption Device (CCID) 224 or similar article is included and is located to be in line between the power phases and the third and fourth relay devices 218, 220. Additionally, a third CCID 226 may be put in line with the input power if desired.

Accordingly, when a first vehicle 500 to be charged is connected to the first device connector 202 and a second vehicle 502 to be charged is connected to the second device connector 204, communication between the vehicles 500, 502 and the UPPD 200 is established as discussed hereinabove. When the UPPD 200 recognizes that the vehicles (or one of the vehicles) 500, 502 are connected and ready to be charged, the nominal voltage of the power source 114 is determined and the UPPD 200 is configured to either be turned off or to output voltage in accordance with either the first configuration 125 or the second configuration 127 (See FIG. 3). When in the first configuration 125 one phase (for example, Phase A) of the power source 114 is connected to the first output port L1 of the first device connector 202 and another phase (for example, Phase B) of the power source 114 is connected to the first output port L1 of the second device connector 204. Additionally, another phase (for example, Phase B) is connected to the second output port N/L2 of the first device connector 202 and another phase (for example, Phase C) is connected to the second output port N/L2 of the second device connector 204. The power source ground is connected to the device ground pin G of the first and second device connectors 202, 204.

However, when in the second configuration 127 one phase (for example, Phase A) of the power source 114 is connected to the first output port L1 of the first device connector 202 and another phase (for example, Phase B) of the power source 114 is connected to the first output port L1 of the second device connector 204, the power source neutral is connected to the second output port N/L2 of the first and second device connectors 202, 204 and the power source ground is connected to the device ground pin G of the first and second device connectors 202, 204. It should be appreciated that in embodiments where there are multiple device connectors 202, 204, the device connectors 202, 204 (and associated circuitry) may be configured to operate independently of each other, so that if only one of the device connectors 202, 204 are being used, the unused device connector 202, 204 is not energized.

It should be appreciated that depending on how many device connectors 102, 202, 204 are included in the UPPD 200, the connections between the power source phases and the first output port L1 and second output port N/L2 should be chosen to achieve as balanced a system as practically possible (although this is not requirement). One such configuration embodiment is shown in Table 1-2 in FIG. 5. An additional embodiment of a UPPD 300 that has more than two device connectors 102, 202, 204 is illustrated in FIG. 6A, FIG. 6B, FIG. 6C and FIG. 6D where the UPPD 100 has three (3) device connectors 302, 304, 306. Additionally, it is contemplated that the balancing of the UPPD system 300 (i.e. the configuring of how the phases are distributed amount the device connectors 302, 304, 306) may be achieved via any method or device as desired and may be situation and/or system dependent. For example, in one embodiment, the device connectors 302, 304, 306 of the UPPD 300 may be hard wired in such a manner to ensure that the system is balanced. This connection configuration is shown in FIG. 5. In another embodiment the UPPD 300 may be configurable to add/subtract charging connectors 302, 304, 306 as desired or in response to dropped or degraded electrical phases. In this case, the system may be automatically balanced using balancing circuitry and/or software or the charging connectors may be hardwired to achieve balance. It should be appreciated that the UPPD may be configured to include any number of device connectors as desired, in which case the power phase connections may be configured as desired to achieve a desired balance. For example, in one embodiment if the UPPD is configured to have six (6) device connectors, then the phase connection arrangement of UPPD 300 (See FIG. 6A) may be extrapolated to accommodate six (6) device connectors.

It should be appreciated that, as discussed above, electrical phase connections may be hard wired between the electrical phases and the relay devices 120, 122, for each of the device connectors 120, 122, 202, 204 to achieve a balanced (or as balanced as possible) system responsive to the number of charging connectors or the phase connections may be determined and configured automatically. One such system and method for automatically determining a balanced configuration is disclosed in U.S. patent application Ser. No. 13/418,023 filed Mar. 12, 2012 and titled Power Management Distribution System and Method, the contents of which are incorporated herein by reference in its entirety.

It should also be appreciated that the present invention may include other embodiments that are applicable in a variety of fields. For example, the present invention may be used in the medical field for providing known power characteristics to medical devices or lighting. In another example, the present invention may be used in the entertainment industry for providing known power characteristics to sound, lighting, video and/or musical devices. In still yet another embodiment, the present invention may be used in the military or emergency fields for providing known power to mission and/or rescue critical devices. The present invention can be used for any type of power convention (i.e. US, European, etc.) as desired. Moreover, it is contemplated that the parameters disclosed and used herein with regards to voltage/power levels illustrate one embodiment only and other parameters and voltage/power levels can be used as desired.

Referring to FIG. 7, an operational block diagram illustrating one embodiment of a method 600 for distributing power from a power source to a device is shown and includes determining the voltage between at least one voltage phase input and neutral input of the power source, as shown in operational block 602. The method 600 further includes identifying when an electric vehicle 500, 502 (or other device) is connected to the device connector 102, 202, 204, 302, 304, 306 of the UPPD 100 (or some other device), as shown in operational block 604. The UPPD 100 is then configured to distribute power to the device connectors 102, 202, 204, 302, 304, 306 of the UPPD 100 responsive to the voltage between at least one voltage phase input and neutral input of the power source, as shown in operational block 606 and distributing the voltage to the device connectors 102, 202, 204, 302, 304, 306 of the UPPD 100, as shown in operational block 608. This may be accomplished as discussed hereinabove and as shown in FIG. 3. It should be appreciated that other thresholds may be used as desired.

It should be appreciated that it is contemplated that the UPPD 100 of the invention is capable of operating with Level 1, Level 2 and Level 3 voltages as desired. Accordingly, the UPPD 100, when connected to a three phase power source at either 208/120V (common in North America, Japan and portions of South America) or 400Y/230V (common in Europe, much of Asia, and portions of South America) will advantageously provide one or more charging outlets at Level 2 voltages. The UPPD 100 will automatically detect the nominal input voltage of the system and reroute the power to the outputs based on the input from the power source. Thus, the electric vehicle power outlet terminals can either be connected to two phases of a three phase 208Y system providing 208V or to a phase and neutral of a 400V system providing 230V. Accordingly, it is contemplated that the UPPD 100 and the components of the UPPD 100 used to carry out the invention should be capable of safely operating at the voltages to which they will be exposed (for example, in some cases line to line voltages of up to 600V).

As mentioned hereinabove, the UPPD 100 of the present invention may be installed and used in areas where more than one nominal voltage is available, such as Brazil where both 208Y and 400Y power can be found. The self configurability of the UPPD 100 to dynamically sense and adjust its output advantageously allows the UPPD 100 to be installed in areas with either nominal voltage (208Y and 400Y) without adjustment. The UPPD 100 can be packaged in a portable form allowing it be deployed with American military or other equipment going overseas. The device can also be connected to utility power or generators operating at either of the supported nominal voltages (208Y or 400Y) and provide Level 2 power (or other levels) for charging vehicles. In fact, it is contemplated that in additional embodiments, any single phase electrical equipment designed to work at 208V-240V can be connected and powered to three phase 208Y or 400Y power through the use of the UPPD 100. For example, a concert touring setup can be build around the present invention to allow the use of the same equipment to be brought on a tour through Europe or on a tour through the United States with the use of locally available power sources. In this application, amplifiers, automated/moving light fixtures, and other types of loads that will work in the 208-240V range can be sourced and powered by the UPPD 100. Thus, the UPPD 100 can be used with the equipment (loads) and can be connected between the power source and the loads to make sure that the loads receive the correct voltages. In this way, the UPPD 100 and the method of the invention advantageously allows for the same equipment to be used in areas with varying power configurations.

It should be appreciated that the method of the present invention may be embodied, in whole or in part, via software, firmware and/or hardware. Moreover, it should be appreciated that although the method of the present invention may be implemented, in whole or in part, via software, hardware, firmware and/or any combination thereof, it is also contemplated that the method of the present invention may also be implemented, in whole or in part, without the use of software, hardware, firmware and/or any combination thereof.

Moreover, it should be appreciated that each of the elements of the present invention may be implemented in part, or in whole, in any order suitable to the desired end purpose. In accordance with an exemplary embodiment, the processing required to practice the method of the present invention, either in whole or in part, may be implemented, wholly or partially, by a controller operating in response to a machine-readable computer program. In order to perform the prescribed functions and desired processing, as well as the computations therefore (e.g. execution control algorithm (s), the control processes prescribed herein, and the like), the controller may include, but not be limited to, a processor(s), computer(s), memory, storage, register(s), timing, interrupt (s), communication interface(s), and input/output signal interface(s), as well as combination comprising at least one of the foregoing. It should also be appreciated that the embodiments disclosed herein are for illustrative purposes only and include only some of the possible embodiments contemplated by the present invention.

Furthermore, the invention may be wholly or partially embodied in the form of a computer system or controller implemented processes. It should be appreciated that any type of computer system (as is well known in the art) may be used and that the invention may be implemented via any type of network setup, including but not limited to a LAN and/or a WAN (wired or wireless). The method of the invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. When implemented on a general-purpose controller the computer program code segments may configure the controller to create specific logic circuits.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A configurable power distribution system, comprising:
    a power input from a power source, wherein the power input includes a first phase power input, a second phase power input, a third phase power input, a neutral input and a ground input;
    a power output device having a first power connection and a second power connection;
    a voltage monitoring device; and
    a plurality of relay devices connected with the voltage monitoring device and the power output device, wherein the plurality of relay devices includes a first relay device and a second relay device,
        wherein the plurality of relay devices are configurably responsive to the voltage monitoring device, and
        wherein the power output device is connected to the plurality of relays such that the power at the first power connection and second power connection is responsive to the configuration of plurality of relay devices, wherein when the voltage between the neutral input and at least one of the first phase power input, the second phase power input and the third phase power input is,
  greater than (>) 255 volts or less than or equal to (≥) 100 volts, then the first and second relay devices are turned off,
  greater than (>) 100 volts or less than or equal to (≤) 135 volts, then the first relay device is turned on and the second relay device is turned off, and
  greater than (>) 135 volts or less than or equal to (≤) 255 volts, the first relay device is turned off and the second relay device is turned on.

2. The configurable power distribution system of claim 1, wherein power output device further includes a ground connection and a control signal connection and is configured to connect to a vehicle that accepts an electrical charge.

3. The configurable power distribution system of claim 2, further comprising a communication device connected to the voltage monitoring device and the control signal connection, such that when the vehicle is connected to the power output device, the communication device and vehicle are in signal communication.

4. The configurable power distribution system of claim 3, wherein when the power output device is connected to the vehicle, the communication device is configured to send a power signal to the voltage monitoring device.

5. The configurable power distribution system of claim 1, wherein the voltage monitoring device is connected to the neutral input and at least one of the first phase power input, the second phase power input and the third phase power input and is configured to sense the voltage between the neutral input and at least one of the first phase power input, the second phase power input and the third phase power input.

6. The configurable power distribution system of claim 5, wherein each of the first relay device and second relay device include first input, a second input, a first output and a second output.

7. The configurable power distribution system of claim 6, wherein,
  the first input of the first relay device is connected to one of the first phase power input, the second phase power input or the third phase power input, and the second input of the first relay device is connected to another of the first phase power input, the second phase power input or the third phase power input, and
  the first input of the second relay device is connected to one of the first phase power input, the second phase power input or the third phase power input, and the second input of the second relay device is connected to the neutral input.

8. A configurable power distribution system, comprising:
a power input from a power source, wherein the power input includes a first phase power input, a second phase power input, a third phase power input, a neutral input and a ground input;
a power output device having a first power connection and a second power connection, a ground connection and a control signal connection and is configured to connect to a vehicle that accepts an electrical charge;
a voltage monitoring device configured to sense a nominal voltage between the neutral input and at least one of the first phase power input, the second phase power input and the third phase power input;
communication device connected to the voltage monitoring device and the control signal connection, such that when the vehicle is connected to the power output device, the communication device and vehicle are in signal communication, and
a plurality of relay devices connected with the voltage monitoring device and the power output device, wherein the plurality of relay devices include a first relay device and a second relay device,
wherein the plurality of relay devices are associated with the monitoring device such that the power at the first power connection and the second power connection are responsive to the nominal voltage, wherein when the nominal voltage is,
  greater than (>) 255 volts or less than or equal to (≥) 100 volts, then the first and second relay devices are turned off,
  greater than (>) 100 volts or less than or equal to (≤) 135 volts, then the first relay device is turned on and the second relay device is turned off, and
  greater than (>) 135 volts or less than or equal to (≤) 255 volts, the first relay device is turned off and the second relay device is turned on.

9. The configurable power distribution system of claim 8, wherein when the power output device is connected to the vehicle, the communication device is configured to send a power signal to the voltage monitoring device.

10. The configurable power distribution system of claim 8, wherein each of the first relay device and second relay device include a first input, a second input, a first output and a second output.

11. The configurable power distribution system of claim 10, wherein,
  the first input of the first relay device is connected to one of the first phase power input, the second phase power input or the third phase power input, and the second input of the first relay device is connected to another of the first phase power input, the second phase power input or the third phase power input, and
  the first input of the second relay device is connected to one of the first phase power input, the second phase power input or the third phase power input, and the second input of the second relay device is connected to the neutral input.

12. A method for distributing power via a configurable power distribution system, wherein the configurable power distribution system includes a power output device having a first power connection, a second power connection and control signal connection, a voltage monitoring device and a plurality of relay devices connected with the voltage monitoring device and the power output device, wherein the plurality of relay devices includes a first relay device and a second relay device that are configurably responsive to the voltage monitoring device, and wherein the power output device is connected to the plurality of relays such that the power at the first power connection and second power connection is responsive to a characteristic of input power to the configurable power distribution system, the method comprising:
  receiving the input power from a power source, wherein the input power includes a plurality of electrical power phases, a neutral and a ground;
  monitoring the voltage differential between at least one of the plurality of electrical power phases and the neutral to identify a nominal voltage; and
  electrically connecting at least one of the plurality of electrical power phases and neutral with the first power connection and the second power connection of the power output device, wherein when the nominal voltage is,
greater than (>) 255 volts or less than or equal to (≥) 100 volts, then the first and second relay devices are turned off,
greater than (>) 100 volts or less than or equal to (≤) 135 volts, then the first relay device is turned on and the second relay device is turned off, and
greater than (>) 135 volts or less than or equal to (≤) 255 volts, the first relay device is turned off and the second relay device is turned on.

13. The method of claim 12, wherein the plurality of electrical power phases includes a first power phase, a second power phase and a third power phase.

14. The method of claim 12, wherein the configurable power distribution system further includes a communication device connected to the voltage monitoring device and the control signal connection, such that when a vehicle is connected to the power output device, the communication device and vehicle are in signal communication.

15. The configurable power distribution system of claim 14, wherein when the power output device is connected to the vehicle, the communication device is configured to send a power signal to the voltage monitoring device.

16. The method of claim 13, wherein each of the plurality of relay devices include a first input, a second input, a first output and a second output, wherein the first input of the first relay device is connected to one of the first phase power input, the second phase power input or the third phase power input, and the second input of the first relay device is connected to another of the first phase power input, the second phase power input or the third phase power input, and the first input of the second relay device is connected to one of the first phase power input, the second phase power input or the third phase power input, and the second input of the second relay device is connected to the neutral input.

* * * * *